US009815369B2

(12) United States Patent
Tran et al.

(10) Patent No.: US 9,815,369 B2
(45) Date of Patent: Nov. 14, 2017

(54) WADING VEHICLE DEPTH MEASUREMENT APPARATUS

(75) Inventors: Thuy-Yung Tran, Whitley (GB); Edward Hoare, Whitley (GB); Nigel Clarke, Bridgnorth (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 606 days.

(21) Appl. No.: 13/994,563

(22) PCT Filed: Dec. 15, 2011

(86) PCT No.: PCT/EP2011/072991
§ 371 (c)(1),
(2), (4) Date: Jul. 24, 2013

(87) PCT Pub. No.: WO2012/080432
PCT Pub. Date: Jun. 21, 2012

(65) Prior Publication Data
US 2013/0307679 A1 Nov. 21, 2013

(30) Foreign Application Priority Data

Dec. 15, 2010 (GB) .................................. 1021268.6
Dec. 15, 2010 (GB) .................................. 1021272.8
Dec. 15, 2010 (GB) .................................. 1021278.5
Dec. 15, 2010 (GB) .................................. 1021295.9
Dec. 15, 2010 (GB) .................................. 1021296.7
Dec. 15, 2010 (GB) .................................. 1021297.5

(51) Int. Cl.
*B60C 23/00* (2006.01)
*B60K 35/00* (2006.01)
(Continued)

(52) U.S. Cl.
CPC ............ *B60K 35/00* (2013.01); *B60G 17/019* (2013.01); *B60G 17/0165* (2013.01); *B60G 17/01908* (2013.01); *B60K 37/02* (2013.01); *B60Q 1/00* (2013.01); *B60R 99/00* (2013.01); *B60W 40/06* (2013.01); *B60W 40/076* (2013.01);
(Continued)

(58) Field of Classification Search
None
See application file for complete search history.

(56) References Cited

U.S. PATENT DOCUMENTS 3,392,694 A 7/1968 Appleton
4,107,994 A 8/1978 Sogo
(Continued)

FOREIGN PATENT DOCUMENTS

DE          19941126 A1    4/2001
DE     102004028157 B3    1/2006
(Continued)

OTHER PUBLICATIONS

Hambrice et al., Leak/Level A Dozen Ways to Measure Fluid Level and How They Work, Dec. 1, 2004.*
(Continued)

*Primary Examiner* — Brian Zimmerman
*Assistant Examiner* — Kevin Lau
(74) *Attorney, Agent, or Firm* — Reising Ethington P.C.

(57) ABSTRACT

A wading vehicle (100) having a water level sensor (114) comprising a hydrostatic pressure sensor.

20 Claims, 4 Drawing Sheets

(51) Int. Cl.

| | |
|---|---|
| G01F 23/28 | (2006.01) |
| B60G 17/019 | (2006.01) |
| G01F 23/18 | (2006.01) |
| B60G 17/0165 | (2006.01) |
| B60W 40/06 | (2012.01) |
| B60W 40/076 | (2012.01) |
| B60W 50/14 | (2012.01) |
| B60K 37/02 | (2006.01) |
| F02D 11/10 | (2006.01) |
| G01F 23/14 | (2006.01) |
| G01S 15/02 | (2006.01) |
| G10K 13/00 | (2006.01) |
| B60Q 1/00 | (2006.01) |
| B60R 99/00 | (2009.01) |
| G01F 23/24 | (2006.01) |
| G01F 23/26 | (2006.01) |
| G06F 7/00 | (2006.01) |
| G01K 13/00 | (2006.01) |
| G01S 15/93 | (2006.01) |
| G01S 15/87 | (2006.01) |
| G01F 23/00 | (2006.01) |
| G01F 23/296 | (2006.01) |

(52) U.S. Cl.
CPC ......... *B60W 50/14* (2013.01); *F02D 11/105* (2013.01); *G01F 23/0061* (2013.01); *G01F 23/0076* (2013.01); *G01F 23/14* (2013.01); *G01F 23/18* (2013.01); *G01F 23/24* (2013.01); *G01F 23/242* (2013.01); *G01F 23/263* (2013.01); *G01F 23/265* (2013.01); *G01F 23/28* (2013.01); *G01F 23/2965* (2013.01); *G01K 13/00* (2013.01); *G01S 15/02* (2013.01); *G01S 15/87* (2013.01); *G01S 15/931* (2013.01); *G06F 7/00* (2013.01); *G10K 13/00* (2013.01); *B60G 2300/07* (2013.01); *B60G 2400/80* (2013.01); *B60G 2400/843* (2013.01); *B60G 2500/30* (2013.01); *B60G 2800/914* (2013.01); *B60K 2350/1076* (2013.01); *B60W 2050/146* (2013.01); *B60W 2420/54* (2013.01); *B60W 2520/16* (2013.01); *B60W 2520/18* (2013.01); *B60W 2550/14* (2013.01); *B60W 2550/142* (2013.01); *B60W 2550/147* (2013.01); *G01F 23/00* (2013.01); *G01F 23/296* (2013.01); *G01S 2015/932* (2013.01); *G01S 2015/938* (2013.01); *Y02T 10/84* (2013.01); *Y10S 367/908* (2013.01); *Y10S 903/93* (2013.01)

(56) References Cited

U.S. PATENT DOCUMENTS

| | | | |
|---|---|---|---|
| 4,144,517 A | 3/1979 | Baumoel | |
| 5,173,692 A | 12/1992 | Shapiro et al. | |
| 5,521,594 A | 5/1996 | Fukushima | |
| 5,978,736 A | 11/1999 | Greendale | |
| 6,430,985 B1 | 8/2002 | Drees | |
| 8,473,173 B1 | 6/2013 | Robles | |
| 9,026,310 B2 | 5/2015 | Tran et al. | |
| 2003/0005765 A1 | 1/2003 | Brudis et al. | |
| 2005/0099276 A1* | 5/2005 | Fujioka | B60C 23/0408 340/426.19 |
| 2005/0170710 A1 | 8/2005 | Darby et al. | |
| 2005/0284218 A1 | 12/2005 | Lagergren | |
| 2006/0113129 A1 | 6/2006 | Tabata | |
| 2007/0007056 A1 | 1/2007 | Bowers et al. | |
| 2007/0167092 A1 | 7/2007 | Rees et al. | |
| 2007/0221430 A1 | 9/2007 | Allison, Sr. | |
| 2007/0244606 A1 | 10/2007 | Zhang et al. | |
| 2008/0030313 A1 | 2/2008 | Obradovich | |
| 2008/0319618 A1 | 12/2008 | Sjogren et al. | |
| 2009/0030581 A1 | 1/2009 | Pollklas et al. | |
| 2009/0150035 A1 | 6/2009 | Soliman et al. | |
| 2009/0159020 A1* | 6/2009 | Hall | F01P 5/04 123/41.11 |
| 2010/0057324 A1 | 3/2010 | Glugla et al. | |
| 2010/0085198 A1* | 4/2010 | Boss | G01F 23/0007 340/618 |
| 2010/0101226 A1 | 4/2010 | Shutty et al. | |
| 2010/0112387 A1 | 5/2010 | Nagasawa | |
| 2010/0250121 A1* | 9/2010 | Kinoshita | G01C 21/32 701/408 |
| 2013/0336090 A1 | 12/2013 | Tran et al. | |
| 2014/0085066 A1 | 3/2014 | Tran et al. | |
| 2014/0156126 A1 | 6/2014 | Tran et al. | |
| 2014/0184247 A1 | 7/2014 | Tran et al. | |
| 2014/0288793 A1 | 9/2014 | Tran et al. | |
| 2014/0293746 A1 | 10/2014 | Tran et al. | |
| 2014/0347178 A1 | 11/2014 | Tran et al. | |
| 2015/0033846 A1 | 2/2015 | Tran et al. | |

FOREIGN PATENT DOCUMENTS

| | | | |
|---|---|---|---|
| DE | 102005038345 A1 | 2/2007 | |
| DE | 102008042016 A1 | 3/2010 | |
| FR | 2622639 A1 | 5/1989 | |
| GB | 2356602 A * | 5/2001 | ........... B60F 3/0046 |
| GB | 2376929 A | 12/2002 | |
| KR | 20110109614 A | 10/2011 | |
| KR | 20110109618 A | 10/2011 | |
| NL | 1011780 C2 | 10/2000 | |
| RU | 2168419 C1 | 6/2001 | |
| WO | 03002378 A1 | 1/2003 | |
| WO | 2009013606 A2 | 1/2009 | |

OTHER PUBLICATIONS

American Sensor Technologies, AST47LP Pressure Sensor/Transducer/Transmitter, 2013.*
International Search Report for PCT/EP2011/072991 dated May 16, 2012, 5 pages.
Combined Search and Examination Report for application No. GB1121623.1, dated Apr. 10, 2012; 4 pages.
Combined Search and Examination Report corresponding to application No. GB1121623.1, dated Apr. 11, 2012, 7 pages.

* cited by examiner

WADING VEHICLE DEPTH MEASUREMENT APPARATUS

TECHNICAL FIELD

The present invention is concerned with an apparatus for measuring the water level relative to a vehicle body. More particularly, but not exclusively, the present invention is concerned with the measurement of the water level of a wading vehicle and providing such information to a driver of the vehicle. Aspects of the invention relate to an apparatus for water level measurement, a vehicle and a method.

BACKGROUND

An off-road vehicle may be defined as a road vehicle having some off-road capability, such as the provision of all wheel drive. Off road vehicles are often required to travel through water to reach their intended destination. Travel through deep water (typically over about 0.3 m in depth) is known as "wading". Known off-road vehicles are designed to wade, and comprise suitably sealed closures to avoid ingress of water into the passenger compartment. The engine air intake is positioned at an elevated position (normally directly in front of and below the windscreen) to prevent water being ingested into the engine, and this intake will often dictate the maximum level of water relative to the body that the vehicle can wade through without risking water ingestion and engine damage.

Prior art methods of determining if the water level is safe to wade through include referring to depth gauges, e.g. permanent graduated poles situated within the water in the case of fords and measurement of the depth by the driver using a partially submerged stick or pole.

The former method requires such a pole to be present, and the latter method involves the driver exiting the vehicle. The latter method in particular will often not reveal the deepest point unless the driver wades in, which is undesirable and dangerous.

Both methods only reveal the absolute depth of the water (from the ground to the water surface). This is often not sufficient to make an accurate assessment of the vehicle's capability to pass. The knowledge that the driver requires is, instead, what the water level is relative to a point on the vehicle body (e.g. the air intake). The distance between the bottom of the vehicle tyres and the air intake is variable (due to suspension travel, tyre pressure variations etc) and as such with known methods the driver must take account of a potential margin of error in making his decision. This is undesirable as the driver may decide not to proceed through water which the vehicle is capable of wading through. Known methods are practicable only in daylight.

An aim of the present invention is to at least mitigate the above mentioned problems.

SUMMARY

Aspects of the invention relate to a vehicle comprising to an apparatus for water level measurement, a vehicle and a method as claimed in the appended claims.

According to another aspect of the invention for which protection is sought, there is provided an apparatus for water level measurement of a wading vehicle comprising a hydrostatic pressure sensor on the vehicle at a position exposed to water level in use, to measure fluid pressure at said position.

The sensor may be directly immersible in water, or be located high on the vehicle and have a downwardly extending open ended tube via which hydrostatic pressure can be sensed.

The sensor is typically on the vehicle body and part of the spring mass. Thus, when the vehicle is wading, the level of fluid above the sensing point is the same as the level of fluid external to the vehicle. External surfaces of components in the engine bay are suitable.

Optionally, the sensor is positioned on a vehicle body component; i.e. a component which is substantially fixed in position relative to the engine air intake.

Advantageously, the level of water above the sensor will be generally proportional to the total pressure at the sensor, whether by sensor immersion, or compression of a trapped volume of air. Therefore by monitoring the pressure, at a known location on the vehicle body, the water level relative to the body can be determined.

Optionally, the sensor is configured to transmit pressure data wirelessly, in some embodiments it is configured to communicate with the vehicle CAN bus with a TPMS protocol. A vehicle CAN (controller area network) is a message protocol, and is the means by which electronic signals are communicated around a vehicle for use in the various components thereof. The pressure sensor may be a TPMS (tyre pressure monitoring system) sensor self powered by for example an on-board lithium battery. Advantageously, TPMS sensors are installed on many vehicles, and the vehicle CAN bus will be preconfigured to receive and process such data. TPMS sensors typically have a unique call sign for polling, and thus a wading sensor may be distinguished from a tyre pressure sensor.

Optionally, the sensor is positioned as low down on the vehicle body as possible, in some embodiments the sensor is positioned at the lower edge of the front bumper or bumper shroud. The sensor may be positioned within the engine bay, and may also be hidden from view.

More than one sensor may be provided. An additional sensor may be provided at a longitudinally spaced position on the vehicle (for example near the rear of the vehicle) to measure vehicle pitch relative to the water surface. A further sensor may be positioned transversely spaced from the first to measure roll relative to the water surface.

Further sensors may also be positioned to verify the reading of the first, or for redundancy.

Optionally, the apparatus comprises a memory and a processor, the memory having software thereon configured to, when run by the processor, calculate a water level from the sensor pressure. The apparatus comprises a display configured to display to the driver the water level.

According to still another aspect of the invention for which protection is sought, there is provided a vehicle comprising an apparatus for water level measurement comprising a hydrostatic pressure sensor on the vehicle at a position exposed to water level in use, to measure fluid pressure at said position.

According to yet another aspect of the invention for which protection is sought, there is provided a method of estimating the water level relative to a wading vehicle comprising the steps of:
  providing a vehicle,
  providing a hydrostatic pressure sensor on the vehicle,
  at least partially immersing the vehicle such that the hydrostatic pressure sensor senses immersion,
  measuring a pressure using the sensor,
  estimating the water level from the pressure measured at the sensor.

In one embodiment the pressure sensor is mounted for immersion.

Optionally, the pressure and therefore level is continuously measured and displayed to the driver.

In some embodiments the method includes determining the orientation of the vehicle from an orientation sensor, and determining a water level on the vehicle at a position spaced from the hydrostatic pressure sensor.

Optionally, the method according includes providing a plurality of said hydrostatic pressure sensor around a vehicle, and interpolating the outputs thereof to indicate vehicle inclination.

Within the scope of this application it is envisaged that the various aspects, embodiments, examples, features and alternatives set out in the preceding paragraphs, in the claims and/or in the following description and drawings may be taken independently or in any combination thereof. For example, features described in connection with one embodiment are applicable to all embodiments unless there is incompatibility of features.

BRIEF DESCRIPTION OF THE DRAWINGS

Embodiments of the present invention will now be described, by way of example only, with reference to the accompanying Figures in which.

DETAILED DESCRIPTION

Figure 1:
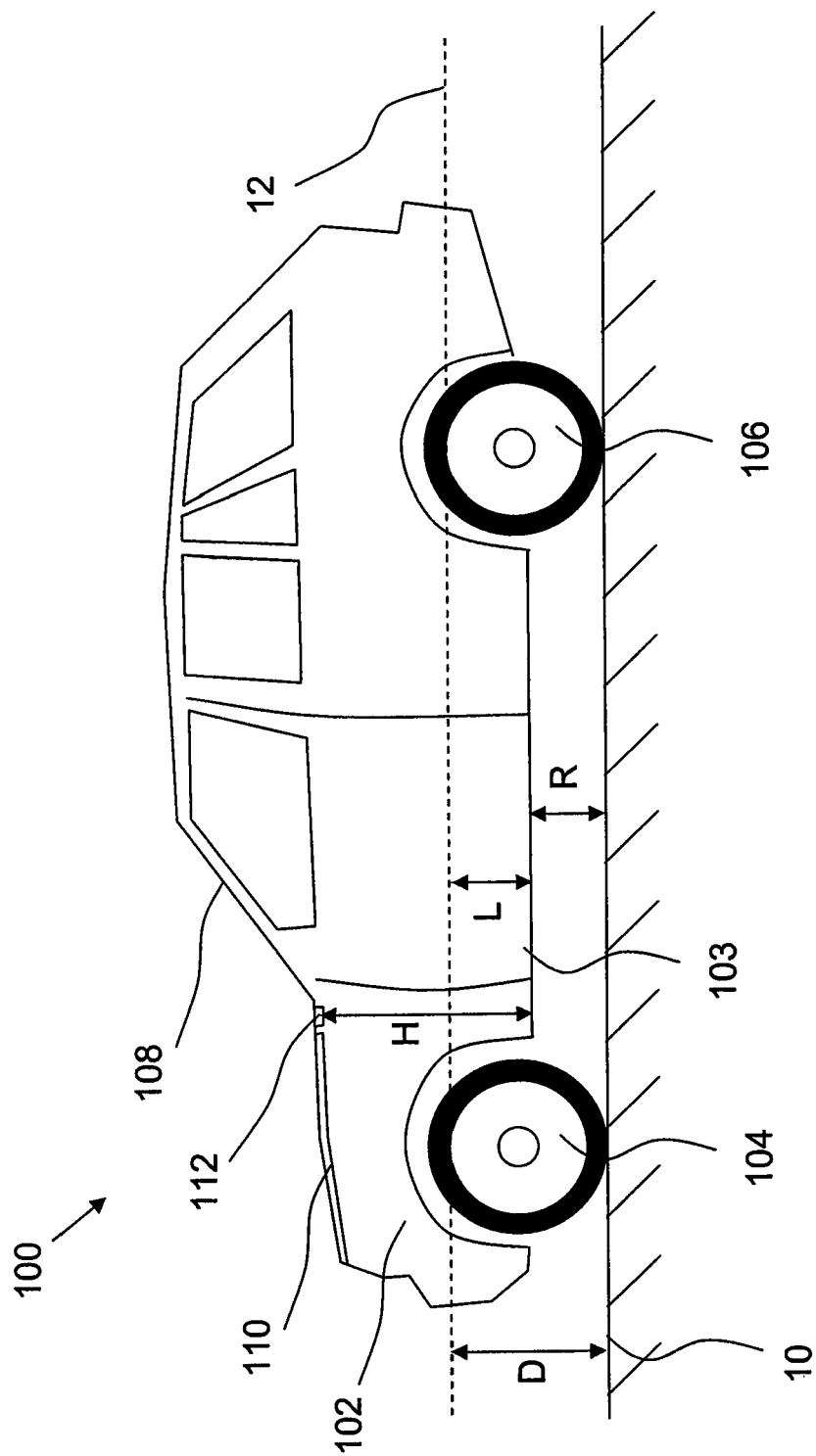
FIG. 1 is a schematic side view of a wading off-road vehicle comprising an apparatus according to an embodiment of the present invention.
Figure 2:
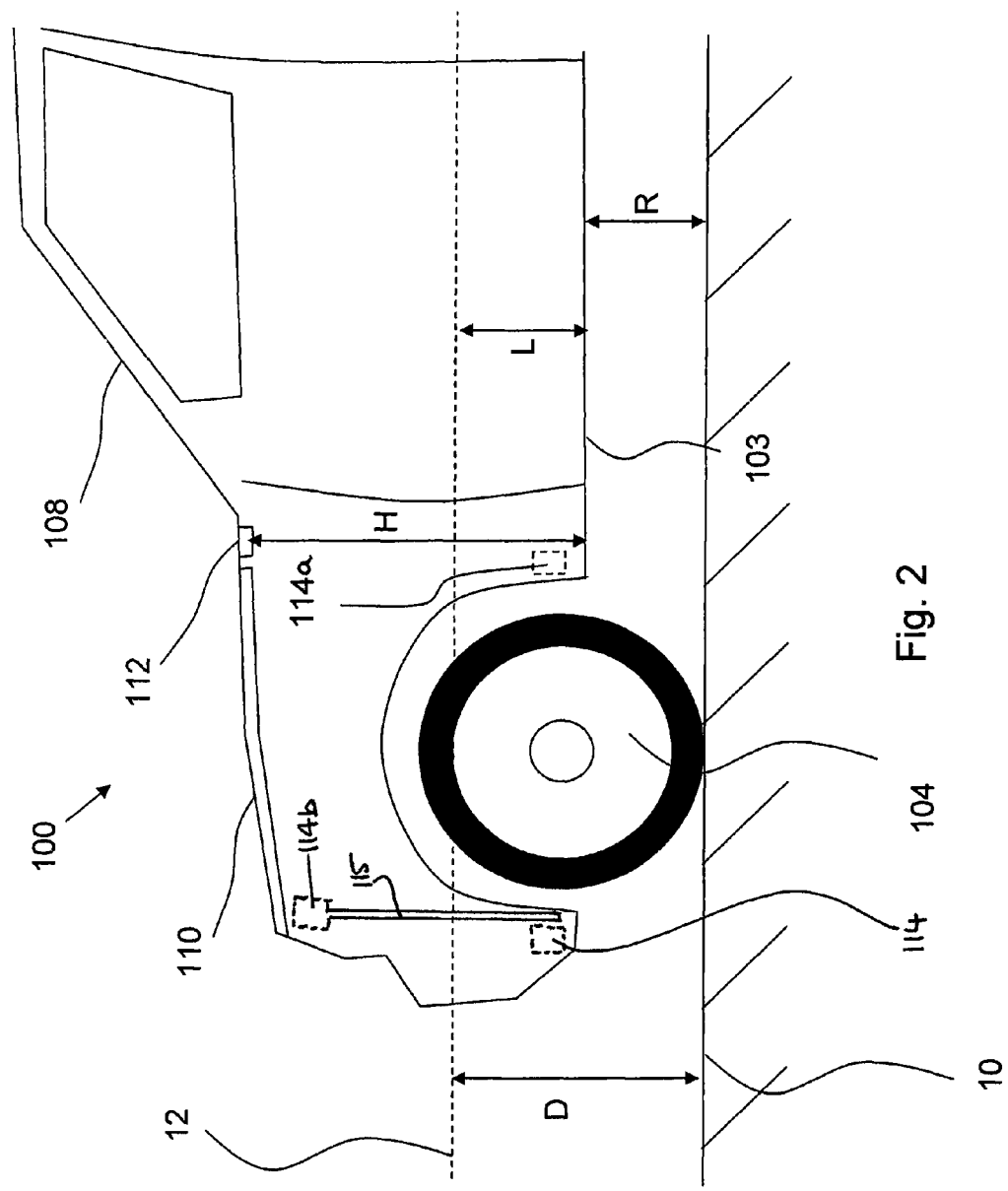
FIG. 2 is a detail view of a part of the vehicle of FIG. 1.

Referring to FIGS. 1 and 2 there is illustrated a vehicle 100 according to embodiments of the present invention; the vehicle 100 comprises a body 102, a left front wheel 104 and a left rear wheel 106. The wheels 104, 106 (and their counterparts on the right hand side of the vehicle 100) are connected to the body 102 via a suspension (not shown). The body 102 defines a sill 103 extending longitudinally between the wheels 104, 106. Each of the wheels 104, 106 comprises a tyre.

The wheels 104, 106 can move relative to the body 102 to define a ride height R between the lowermost point of the tyres (where they contact the ground) and the lowermost point on the body 102. The ride height R varies with suspension travel and may be varied by the driver (for example to move from an on-road mode when R is small to an off-road mode when R is large).

The body 102 comprises a windscreen 108 and a bonnet (or hood) 110 covering an engine bay. On the body 102 between the windscreen 108 and the bonnet 110 there is defined and engine intake orifice 112. The orifice 112 is connected to an air filter and intake manifold of the engine (not shown). The intake orifice 112 is positioned at a height H from the lowermost part of the body 102.

The vehicle 100 is shown wading through water 12 at a water depth D from a ground level 10. The water depth D should be distinguished from the water level represented by L which is the level of the water 12 above the lowermost point on the body 102.

It will be noted that although D can be measured (by a roadside gauge or a measuring stick), the distance L is unknown (as the ride height R can vary). In order to know whether the vehicle 100 can be taken through the water 12, the distance between the intake orifice 112 and the water level needs to be determined.

Referring to FIG. 2, the front section of the vehicle 100 is shown. A level sensing apparatus 114 according to an embodiment of the present invention is shown in dotted line and is positioned at the lower front edge of the bumper or bumper shroud so as to be in a position where first water contact is most likely. In some embodiments a more rearward position 114a may be selected, for example near the vehicle sill 103, within the engine bay on the engine bay bulkhead. A sensor 114b may be positioned above the sensing position and connected thereto by an open ended tube or pipe 115. When the open end is immersed, hydrostatic pressure exerted on the sensor 114b increases according to the depth of immersion. The open end may be closed by a screen or diaphragm so as to prevent blockage by debris whilst effectively transmitting hydrostatic pressure. The sensor 114a is positioned substantially in vertical registry below the air intake 112 as this is the critical component which should not be immersed in water 12 when wading. The level sensing apparatus 114 comprises a fluid pressure transducer having a sensing surface exposed to the prevailing fluid (which in the case of FIG. 2 is the water 12).

The sensor 114, 114a, 114b may be encapsulated in a vehicle body component, such as a trim piece. It will be appreciated that sensor 114b need not be waterproof.

The pressure transducer is configured to have a working range suitable for measuring a water level L slightly higher than height H (the maximum wading depth). A water depth of 1 m above the apparatus 114 will result in a pressure of 9810 Pa (or 0.0981 bar or about 1.4 psi). Therefore the pressure transducer has a working range of within 0 Pa gauge pressure to 0.1 bar gauge pressure.

The pressure transducer is configured to report a range of pressures rather than a simple binary signal, and as such the water level L can be calculated and reported to the driver in real time, as opposed to simply telling the driver when a certain level has been exceeded.

In some embodiments of the invention, a control/diagnostic system is provided (not shown) in which the hydrostatic pressure at the apparatus 114 is used to calculate the water level L, which is then displayed to the driver or used to operate other systems on the vehicle 100 (e.g. a speed limiter). The water level above the apparatus 114 is calculated by dividing the measured hydrostatic pressure by the density of water (1000 kg/m3) multiplied by the gravitational constant (9.81 m/s2). This is then added to the height of the apparatus 114 above the sill 103 to determine the depth D.

Figure 3:
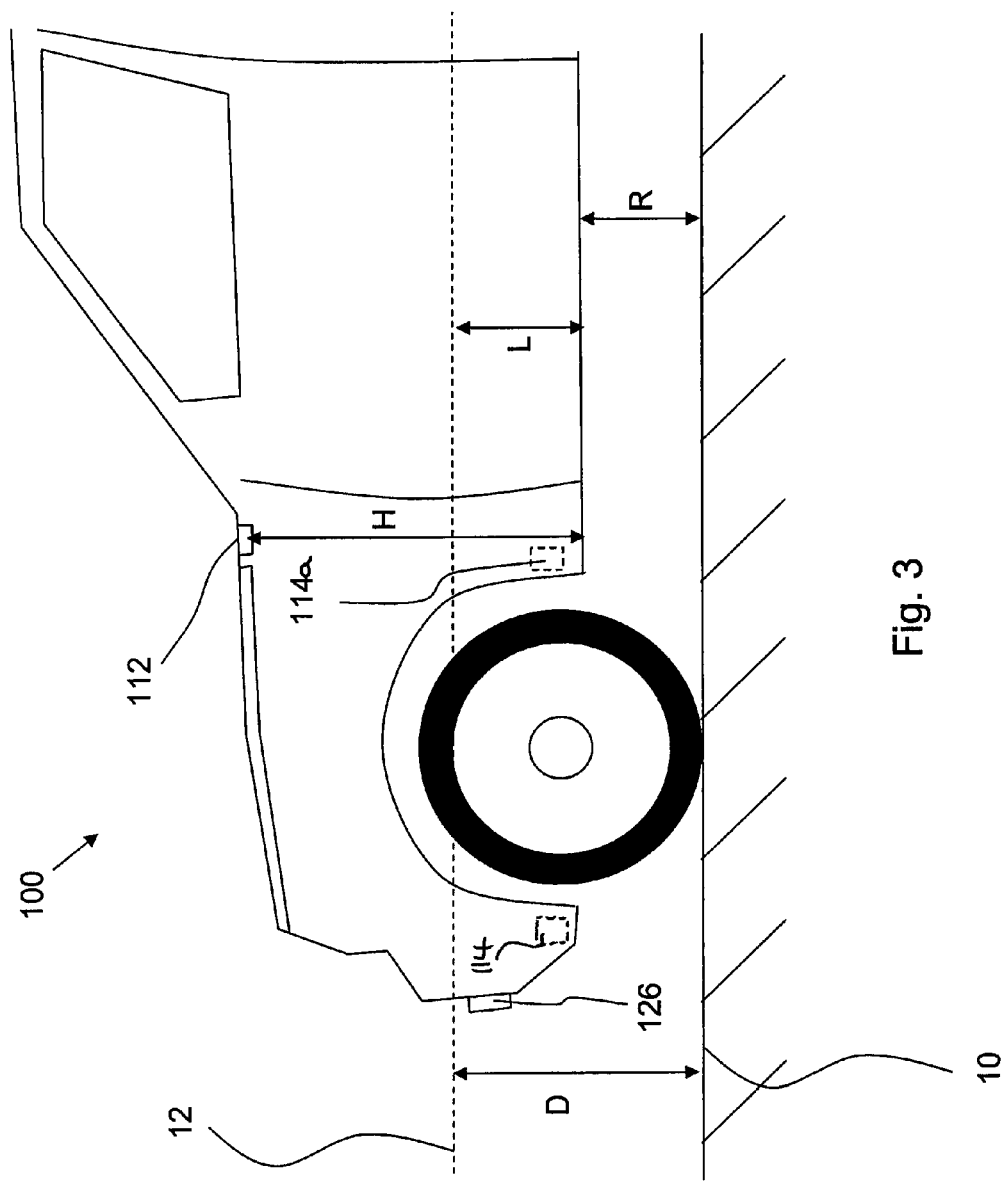
FIG. 3 is a schematic side view of a wading off-road vehicle comprising an apparatus according to an alternative embodiment of the present invention.

FIG. 3 illustrates another embodiment of the invention in which the vehicle 100 comprises a PDC (parking distance control) sensor 126. The PDC sensor 126 is capable of detecting the presence of water 12 and as such is used to activate the otherwise dormant apparatus 114.

Figure 4:
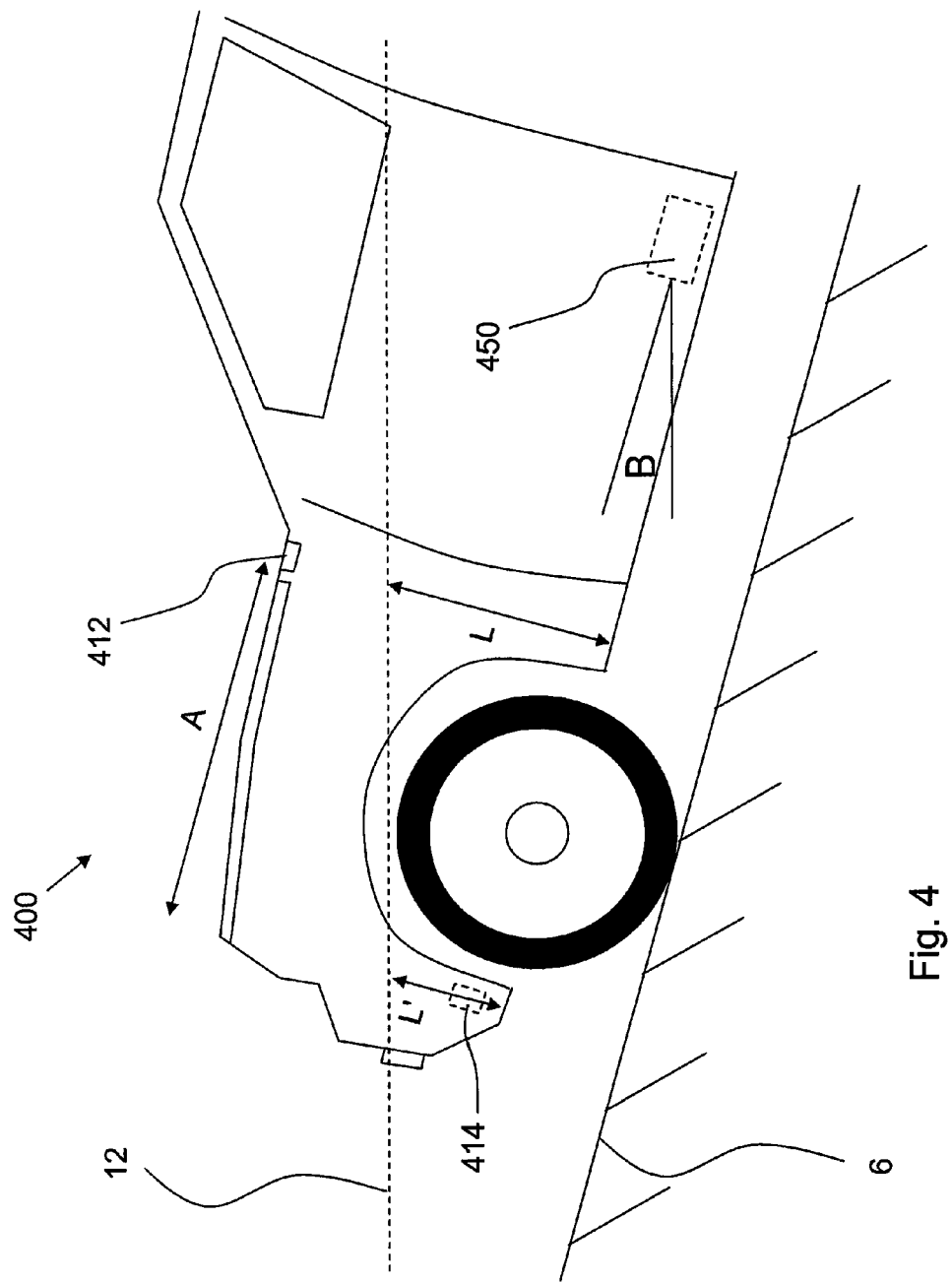
FIG. 4 is a schematic side view of a wading off-road vehicle comprising an apparatus according to a further embodiment of the present invention.

Referring to FIG. 4, a vehicle 400 according to an alternative embodiment is shown similar to vehicle 100 but having an apparatus 414 positioned proximate the front bumper (i.e. not directly below an air intake 412). The apparatus 414 is positioned at a distance A from the intake 412 horizontally in the vehicle body local coordinate system. As shown, the vehicle 400 is backing down an inclined ramp 6 with a water level 12.

As can be seen, the apparatus 414 will only report a water level L', when it is the water level L directly below the intake 412 that is important.

A vehicle inclination sensor 450 is provided, and can measure an inclination angle B. Because the distance A is known, the level L can be calculated from the level L' by the calculation L=L'+A.tan(B).

Where a tyre pressure monitoring sensor (TPMS) sensor or TPMS sensor protocol is used, the sensor may be re-calibrated to sense pressures in the range appropriate to vehicle immersion (e.g. 0-3 psi) rather than that appropriate to tyre pressure (e.g. 5-50 psi). The polling rate may also be substantially increased.

In some embodiments the immersion sensor may be constantly enabled whilst the vehicle ignition is 'on', but may be capable of being switched on or off according to the requirements of the driver. Thus an experienced driver may wish to manually enable a wading level measurement apparatus on demand.

Described herein is a high mounted sensor and a tube extending down to a sensing position, through which hydrostatic pressure is sensed. The sensor may measure absolute pressure or gauge pressure (above atmospheric pressure). The vehicle ECU may also be provided with an input signal of barometric pressure according to which pressure signals from the water level sensor may be interpreted.

In some embodiments a plurality of hydrostatic pressure sensors may be provided at different locations on the vehicle 100, 400. Given the fact that the height and location of the sensors on the vehicle is known, the water level can be assumed to be substantially flat or horizontal the data from the sensors can be interpolated to indicate inclination of the vehicle 100, 400.

The present application claims priority to UK patent application numbers filed by the present applicant on 15 Dec. 2010 having the application numbers GB1021268.6, GB1021278.5, GB1021272.8, GB1021297.5, GB1021295.9 and GB1027296.7, the contents of each of which are expressly incorporated by reference in their entirety.

The present application is related to the PCT applications, filed concurrently with the present application, and naming at least one inventor in common with the present application, which are listed below:
1. PCT application No. PCT/EP2011/072998 to Thuy-Yung TRAN and Edward HOARE filed 15 Dec. 2011, entitled "Ultrasonic Wading Detection System for a Vehicle";
2. PCT application No. PCT/EP2011/072999 to Thuy-Yung TRAN and Edward HOARE, filed 15 Dec. 2011, entitled "Wading Detection System for a Vehicle";
3. PCT application No. PCT/EP2011/072986 to Thuy-Yung TRAN, Edward HOARE and Nigel CLARKE, filed 15 Dec. 2011, entitled "Vehicle Control System";
4. PCT application No. PCT/EP2011/072997 to Thuy-Yung TRAN, Edward HOARE and Nigel CLARKE, filed 15 Dec. 2011, entitled "Wading Depth Estimation For A Vehicle";
5. PCT application No. PCT/EP2011/072988 to "Thuy-Yung TRAN, Edward HOARE and Nigel CLARKE", filed 15 Dec. 2011, entitled "Wading Vehicle Depth Measurement Apparatus";
6. PCT application No. PCT/EP2011/072990 to Thuy-Yung TRAN, Edward HOARE and Nigel CLARKE, filed 15 Dec. 2011, entitled "Vehicle Orientation Device and Method";
7. PCT application No. PCT/EP2011/072992 to Thuy-Yung TRAN, Edward HOARE, Anthony JONES, Simon THOMSON and Ashutosh TOMAR, filed 15 Dec. 2011, entitled "Wading Vehicle Water Level Display";
8. PCT application No. PCT/EP2011/072994 to Thuy-Yung TRAN, Edward HOARE, Anthony JONES, Simon THOMSON and Ashutosh TOMAR, filed 15 Dec. 2011, entitled "Wading Vehicle Water Level Display";
9. PCT application No. PCT/EP2011/072996 to Thuy-Yung TRAN, Edward HOARE, Anthony JONES, Simon THOMSON and Ashutosh TOMAR, filed 15 Dec. 2011, entitled "Wading Vehicle Advisory Speed Display".

The contents of the above referenced PCT applications (and corresponding UK applications, filed concurrently and having the same ownership, inventorship and Title as the above listed PCT applications) are hereby expressly incorporated by reference in their entirety into the present application.

The invention claimed is:

1. An apparatus for measurement of a depth (D) of water about a vehicle and/or for measurement of a water level (L) relative to the vehicle, the apparatus comprising a hydrostatic pressure sensor positioned on the vehicle at a location whereat when the hydrostatic pressure sensor is in use it is directly immersible in water, said hydrostatic pressure sensor being arranged to measure fluid pressure at said location and being configured to transmit data indicative of water depth and/or water level wirelessly, wherein the hydrostatic pressure sensor is a Tire Pressure Monitoring System (TPMS) sensor, and the TPMS sensor is positioned on a vehicle body component.

2. An apparatus according to claim 1 wherein the apparatus is configured to communicate with a vehicle Communication Area Network (CAN) bus with a Tire Pressure Monitoring System (TPMS) protocol.

3. An apparatus according to claim 2, wherein said TPMS sensor is calibrated to sense pressures in a pressure range between about 0 to about 3 psi.

4. An apparatus according to claim 1, wherein said TPMS sensor is positioned at the front lower edge of the vehicle.

5. An apparatus according to claim 1, wherein said TPMS sensor is positioned on the inside of the vehicle body component.

6. An apparatus according claim 1, wherein the apparatus comprises a memory and a processor, the memory having software thereon configured to, when run by the processor, calculate a water depth and/or water level from the fluid pressure measured and wirelessly transmitted by said TPMS sensor.

7. An apparatus according to claim 1, wherein the apparatus further comprises a display configured to display to the driver of the vehicle the measured water depth and/or water level.

8. A vehicle comprising a system for aiding a driver's control of the vehicle when the vehicle is wading, the system comprising a memory, a processor, and an apparatus for measurement of a depth of water about the vehicle and/or measurement of a water level relative to the vehicle, the apparatus comprising a hydrostatic pressure sensor positioned on the vehicle at a location whereat when the hydrostatic pressure sensor is in use it is directly immersed in water, said hydrostatic pressure sensor being arranged to measure fluid pressure at said position and being configured to transmit data indicative of the water depth and/or level wirelessly to the processor, wherein the hydrostatic pressure sensor is a Tire Pressure Monitoring System (TPMS) sensor, and the TPMS sensor is positioned on a vehicle body component.

9. A vehicle according to claim 8 wherein the processor of the system is configured to calculate an angular orientation of the vehicle using the data wirelessly transmitted by the apparatus and said further apparatus.

10. A method of estimating a depth of water and/or a water level relative to a wading vehicle, the method comprising:
providing a vehicle;
providing a hydrostatic pressure sensor on the vehicle at a location whereat the hydrostatic pressure sensor is immersible in water;
at least partially immersing the vehicle such that the hydrostatic pressure sensor senses immersion;
measuring a pressure using the hydrostatic pressure sensor;
transmitting wirelessly data indicative of water depth and/or water level; and
estimating the water level and/or water depth from the pressure measured at the hydrostatic pressure sensor,
wherein providing a hydrostatic pressure sensor comprises providing a Tire Pressure Monitoring System (TPMS) sensor, and the TPMS sensor is positioned on a vehicle body component.

11. A vehicle according to claim 8 comprising at least one further apparatus for measurement of a depth of water about the vehicle and/or a water level relative to the vehicle, the further apparatus comprising a hydrostatic pressure sensor positioned on the vehicle at a location spaced from the location of said apparatus, whereat in use the hydrostatic pressure sensor is directly immersed in water, said hydrostatic pressure sensor of the further apparatus being arranged to measure fluid pressure at said spaced location and being configured to transmit data indicative of the water depth wirelessly to the processor.

12. A vehicle according to claim 8 wherein the TPMS sensor is configured to have a working range of between about 0 to about 3 psi.

13. A vehicle according to claim 8 wherein the TPMS sensor is configured to communicate with a vehicle Communication Area Network (CAN) bus with a TPMS protocol and is calibrated to sense pressures in a pressure range of between about 0 to about 3 psi.

14. A vehicle according to claim 8 wherein the TPMS sensor is positioned on a vehicle body component at the front lower edge of the vehicle or on the inside of a vehicle body component.

15. A vehicle according to claim 8 wherein the system comprises an orientation sensor and the processor is configured to determine a water level on the vehicle at a position spaced from the TPMS sensor using the orientation of the vehicle as determined from said orientation sensor.

16. A vehicle according to claim 8 wherein the system further comprises an in-vehicle display for displaying the water depth and/or water level to the driver and wherein the TPMS sensor is configured to measure, continuously, water pressure for estimating the water depth and/or water level, and the water depth and/or water level is shown by the in-vehicle display.

17. An apparatus according to claim 1, wherein said TPMS sensor is positioned in vertical registry below the engine air intake.

18. A vehicle according to claim 8, wherein the TPMS sensor is positioned in vertical registry below the engine air intake.

19. A method according to claim 10, wherein the TPMS sensor is positioned in vertical registry below the engine air intake.

20. An apparatus according to claim 1, wherein said vehicle body component comprises a trim piece of the vehicle body, and said TPMS sensor is encapsulated in said trim piece.

* * * * *